June 8, 1954  W. W. MOE  2,680,378
DRIVE MECHANISM
Filed Oct. 26, 1950  2 Sheets-Sheet 1
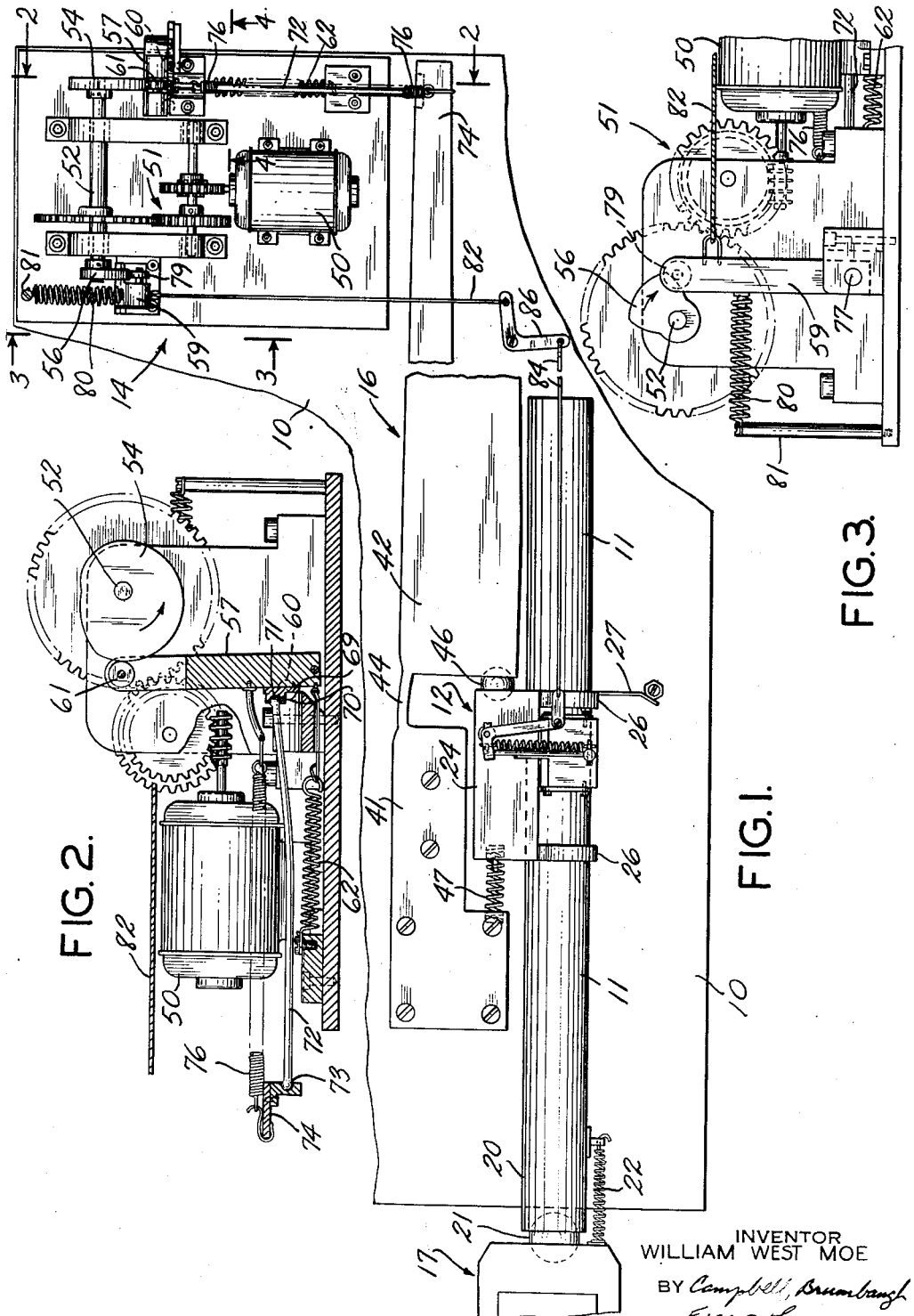
INVENTOR
WILLIAM WEST MOE
BY Campbell, Brumbaugh
Free & Grave.
his ATTORNEYS.

June 8, 1954 W. W. MOE 2,680,378
DRIVE MECHANISM
Filed Oct. 26, 1950 2 Sheets-Sheet 2

INVENTOR
WILLIAM WEST MOE
BY
Campbell, Brumbaugh, Free & Graves
his ATTORNEYS

Patented June 8, 1954

2,680,378

UNITED STATES PATENT OFFICE 2,680,378

DRIVE MECHANISM

William West Moe, Stratford, Conn., assignor to Time, Incorporated, New York, N. Y., a corporation of New York Application October 26, 1950, Serial No. 192,231

7 Claims. (Cl. 74—84)

The present invention relates to a drive mechanism designed to advance an element thereof a predetermined incremental distance at regular intervals. The mechanism is particularly suitable in conjunction with devices wherein the amount and timing of each incremental advance must be made with extreme accuracy.

For illustrative purposes only, the mechanism of the present invention is described herein as operable in conjunction with a device for scanning film mounted on a rotatable drum. It is to be understood, however, that the invention is not limited to such use.

It is well known that a film mounted for scanning on a rotatable drum must be advanced, upon each revolution of the drum, by an increment equal to the width of the scanning beam. These increments of advance are extremely small. Thus, for example, scanning may be carried out at the rate of 250 or 500 or an even greater number of lines to the inch. This requires the film to be advanced .004 or .002 inch or even less, respectively, per revolution of the scanning drum.

Devices have already been proposed to advance a scanning drum axially by the required amount upon each revolution of the drum. One such mechanism utilizes the thread of a screw machined as accurately as possible to advance the scanning drum at a constant speed such that the drum will be advanced an increment of say .004 or .002 inch per revolution of the drum. This mechanism has several serious and inherent disadvantages. Probably the most important of these is that it has been found impossible to machine a screw thread with sufficient accuracy to avoid formation of objectionable lines in the image or images reproduced by the scanning operation. Another disadvantage is that the rate of advance per revolution of the drum is not adjustable.

It has now been found that the scanning drum can, with extreme accuracy, be advanced stepwise and in an axial direction a predetermined increment of distance upon each revolution thereof by a mechanism which in essence includes a push rod movable endwise on a fixed support, a pusher slidable on the rod, a means for reciprocating the pusher with an amplitude equal to the desired increment of the advance, and means for alternately locking the pusher to the rod and releasing it from the rod in timed relationship with the reciprocating motion thereof to advance the rod stepwise toward the scanning mechanism and thereby advance the scanning drum axially during each cycle of movement of the reciprocating collar.

The mechanism is adjustable so that the increment of advance can be increased or decreased at will.

One advantage of the invention is that it provides a mechanism for moving the scanning drum axially from one scanning position to the next after one line has been scanned and before the scanning of the next line begins, thus permitting straight rather than helical scanning.

Other advantages of the invention are that the increment of advance is controllable with extreme accuracy, is readily adjustable and that a relatively small number of parts of the mechanism are required to be machined with extreme accuracy.

These and still other advantages, as well as the utility of the invention, will become more apparent from the following detailed description made with reference to the accompanying drawing wherein:

Figure 1 is a plan view of the mechanism of this invention;

Figure 2 is an end view in elevation taken along section line 2—2 of Figure 1;

Figure 3 is an end view in elevation taken along section line 3—3 of Figure 1;

Figure 5:
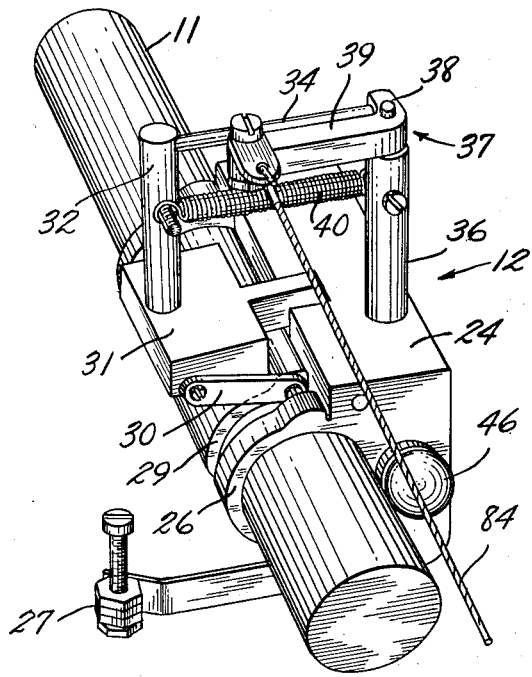
Figure 5 is a view in perspective showing the details of construction of the pusher from one end thereof.

The mechanism illustrated in Figure 1 includes, generally, a fixed support or base 10, a push rod 11 movable axially relative to the support, a pusher 12 slidable on the rod 11, an actuating mechanism 14 and an enlongated transmitter bar 16. The mechanism, such as a scanning device, to be advanced stepwise relative to the support 10, is indicated generally at 17.

The push rod 11 is provided at the forward end 20 with a steel ball 21 maintained in abutment with a scanner carriage 17 by a tension spring 22 between the carriage 17 and the pusher rod 11. This connection not only avoids backlash between the rod and the carriage but also provides support for one end of the rod.

The pusher 12 includes a body portion 24, a pair of fixed collars 26 slidable on the push rod 11, a support and leveling device 27 and a locking mechanism comprising a flexible collar 29, toggle arms 30, a rocker member 31 pivoted in the body portion 24, a rocking standard 32 and compression bar 34 projecting from the rocking standard at substantially a right angle, a fixed standard 36 on the body portion 24, a lever 37 having a short arm 38 and a long arm 39 pivoted on the standard 36, and a tension spring 40 between the standards 32 and 36.

The transmitter bar 16 includes a fixed portion 41 secured to the support 10, a movable portion 42 and a flex section 44 of reduced cross section intermediate the portions 41 and 42. The movable portion 42 is provided with a steel ball 46 maintained in abutment with the body portion 24 of the pusher 12 by the action of a compression spring 47 urging the pusher 12 toward the right as seen in Figure 1.

It will be apparent from the foregoing description that the push rod and pusher assembly is supported by the steel balls 21 and 46 and the support and leveling device 27.

The actuating mechanism 14 in the embodiment illustrated includes a synchronous motor 50, a gear train indicated generally at 51, a shaft 52, cams 54 and 56 and oscillating members 57 and 59.

Figure 4:
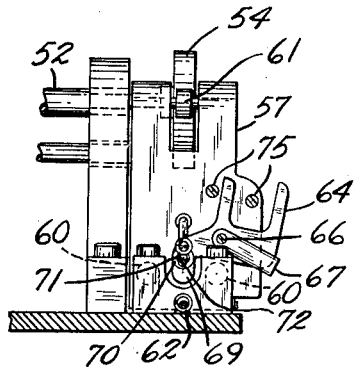
Figure 4 is a detailed view in elevation taken along section line 4—4 of Figure 1.
Figure 6:
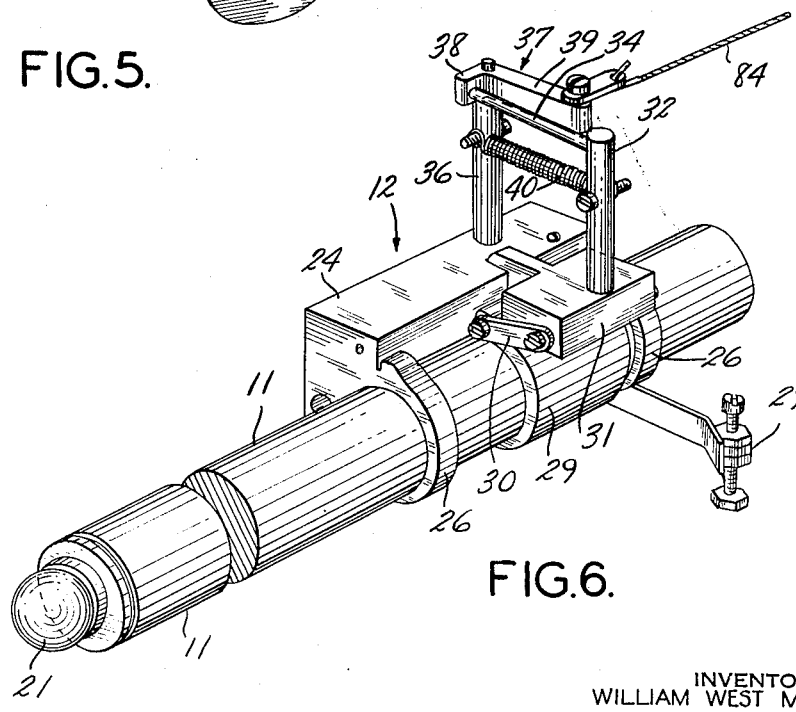
Figure 6 is a view in perspective showing the details of construction of the pusher and the other end thereof.

The oscillating member 57 is pivoted on two steel balls 60 above the base thereof and is provided at the top with a cam follower 61 constrained to follow the contour of the cam 54 by the action of a tension spring 62 secured to the base of the oscillating member 57 at a point below the pivot point 60. A stroke adjusting lever 64, best shown in Figure 4, is pivotally attached to the oscillating member 57 by a lock screw 66 operable by means of a lock lever 67. The lower leg 69 of the stroke adjusting lever 64 is provided with a ball socket 70 for receiving the ball end 71 of a connecting rod 72 secured at the other end to the other extremity 74 of the movable portion 42 of the transmitter bar 16 by a ball and socket joint 73. The movement of the stroke adjusting lever 64 is limited by stroke presetting stops 75. Substantially parallel to the connecting rod 72 there is provided a tension spring 76 secured at one end to the oscillating member 57 and at the other end to the outer extremity 74 of the transmitter bar 16.

The contour of the cam 54 is preferably such that the oscillating member 57 will move to the left, as seen in Figure 2, with substantially uniform acceleration and deceleration, then remain stationary or at dwell for an interval, then make a relatively rapid return stroke with substantially uniform acceleration and deceleration, and again remain stationary or at dwell for an interval to complete its cycle.

The oscillating member 59, shown best in Figure 3, is pivoted at 77 and is provided at the top with a cam follower 79 which is constrained to follow the contour of the cam 56 by the action of a tension spring 80 between the oscillating member 59 and a standard 81. The oscillating member 59 is connected to the long arm 39 of the lever 37 by any suitable means such as wires 82 and 84 and bell crank 86.

The contour of the cam follower 56 is such that the oscillating member 59 will have a long period of dwell in its left position, as seen in Figure 3, a somewhat shorter period of dwell in its right position, and relatively rapid movements between dwell positions.

The positions of the cams 54 and 56 relative to one another on the shaft 52 is such that oscillating member 59 will move from its right to its left dwell position, as shown in Fig. 3, while the oscillating member 57 is in its extreme right dwell position, as seen in Figure 2. The oscillating member 59 will remain in its left dwell position while the oscillating member 57 moves to the left. After the oscillating member 57 has arrived at its left dwell position, the oscillating member 59 is moved relatively rapidly to its right dwell position and remains in that position until the oscillating member 57 has completed its cycle by returning to its right dwell position.

*Operation*

In operation the synchronous motor 50, in cooperation with the gear train 51, operates to rotate the shaft 52 in synchronism with the rotation of the scanner drum of the scanning mechanism indicated generally by the reference numeral 17. When the oscillating member 59, in following the contour of the cam 56, moves from its right to its left dwell position by the action of tension spring 80, it pulls the wires 82 and 84 to rotate the lever 37 in a counterclockwise direction, as seen in Figure 1. The resulting movement of the short arm 38 toward the rocking standard 32 causes the rocker member 31 to pivot in the body portion 24 of the pusher 12 and actuate the toggle arms 30 to tighten the flexible collar 29 around the push rod 11 and thereby locks the pusher 12 securely to the rod.

While the locking mechanism of the pusher 12 remains in the locked position due to the dwell of the oscillating member 59 in its left position, the oscillating member 57 is caused, by the cam 54, to move from its right to its left dwell position. In so doing the oscillating member 57 pushes against and moves to the left, as seen in Figure 2, the connecting rod 72 which, by reason of its engagement with the extremity 74 of the transmitter bar 16 causes the movable portion 42 thereof to move in a clockwise direction, as seen in Figure 1, around the flex section 44. This movement, in turn, is transmitted to the pusher 12 through the medium of steel ball 46. The pusher 12, being locked to the push bar 11, operates to advance the push bar the desired increment of distance and, by reason of the abutment of the end 20 thereof with the scanner carriage 17, this motion is transmitted to the scanner mechanism.

While the oscillating member 57 is at the left dwell position and the pusher 12 is likewise stationary in its left position, as seen in Figure 1, the oscillating member 59 is urged to move to its right dwell position by the cam 56. The tension spring 40 operates to pull the standards 32 and 36 toward one another and in so doing causes compression bar 34 to act on the short arm 38 of the lever 37 to rotate the lever in a clockwise direction, as seen in Figure 1, and thereby return the wires 84 and 82 to their initial positions. The movement of the standards 32 and 36 towards one another by means of spring 40 operates to raise the rocking member 31 and thereby to actuate the toggle arms 30 to release the flexible collar 29 from its locking engagement with the push rod 11.

While the pusher 12 is thus released from locking engagement with the push rod 11, and is freely slidable on fixed collars 26, the oscillating member 57, by the action of tension spring 62, is urged to follow the contour of the cam 54 and return to its right dwell position. The movement of the oscillating member 57 to the right permits the pusher rod 72 to move to the right, as seen in Figure 2, and thus relieves the pressure thereof against the extremity 74 of the transmitter bar 16 which is thereupon urged to move to the right, likewise as seen in Figure 2, by the action of tension spring 76. This movement of the transmitter bar 16 permits the pusher 12, due to the force exerted by compression spring 47, to return to its initial position relative to the support 10 while the disengaged position of the flexible collar 29 allows the pusher 12 to do so without returning push rod 11 to its initial position.

If it is desired to increase the increment of distance the push bar 11 is advanced during each cycle of operation, the stroke adjusting lever 64 is pivoted in a clockwise direction, as seen in Figure 4, to increase the distance between the ball and socket connection 70, 71 of the pusher rod 72 and the pivot point 69 of the oscillating member 57. If it is desired to decrease the increment of advance, adjusting lever 64 is moved counterclockwise. When the ball and socket connection 70, 71 is in the desired position relative to the pivot point 69, the adjusting lever 64 is locked by actuation of locking screw 66 through the medium of locking lever 67. For convenience, the stroke presetting stops 75 may be so positioned that upon engagement of the lever 64 with one the mechanism will automatically be set for 250-line scanning and upon engagement of the lever with the other stop it will be set for 500-line scanning.

It is to be understood that many changes and alterations will occur to those skilled in the art upon reading this description and that the mechanism of the present invention is by no means confined to the function of advancing a scanning mechanism. All such changes and modifications are intended to be included within the scope of the invention as defined in the appended claims.

I claim:

1. Drive mechanism which comprises a smooth-surfaced push rod movable endwise, a pusher slidable on the push rod, first means for locking the pusher to the rod and releasing it from locking engagement therewith, a second means for reciprocating the pusher axially of the rod, and means for alternately actuating said first and second means in timed relationship successively to lock the pusher on the push rod, move the locked pusher in one direction to advance the push rod, release the pusher from the push rod, and return the unlocked pusher to its initial position without moving the push rod.

2. Drive mechanism which comprises a smooth-surfaced push rod movable endwise, a pusher slidable on the push rod, a gripping member on the pusher for locking the pusher to the rod and releasing it from locking engagement therewith, means for reciprocating the pusher axially of the rod, and means for alternately actuating the gripping member and the reciprocating means in timed relation successively to lock the pusher on the push rod, move the locked pusher in one direction to advance the push rod, release the pusher from the push rod, and return the unlocked pusher to its initial position without moving the push rod.

3. Drive mechanism as defined in claim 2 wherein the gripping member comprises a flexible collar adapted to be tightened around the push rod to lock the pusher to the rod and loosened to permit substantially frictionless sliding of the pusher axially of the rod.

4. Drive mechanism which comprises a push rod movable endwise, a pusher slidable on the push rod, a gripping member on the pusher for locking the pusher to the rod and releasing it from locking engagement therewith, means for reciprocating the pusher axially of the rod, and means for alternately actuating the gripping member and the reciprocating means in timed relation successively to lock the pusher on the push rod, move the locked pusher in one direction to advance the push rod, release the pusher from the push rod, and return the unlocked pusher to its initial position without moving the push rod, wherein the reciprocating means includes a transmitter means comprising an elongated bar fixed against movement at one end and having a flex portion of reduced cross section intermediate said fixed end and the remainder of the bar permitting limited movement of said remainder relative to the fixed end, said remainder of said elongated bar being in abutment with the pusher and said means for actuating the gripping member being operatively connected to said gripping member.

5. Drive mechanism which comprises a push rod movable endwise, a pusher slidable on the push rod, a gripping member on the pusher for locking the pusher to the rod and releasing it from locking engagement therewith, means for reciprocating the pusher axially of the rod, and means for alternately actuating the gripping member and the reciprocating means in timed relation successively to lock the pusher on the push rod, move the locked pusher in one direction to advance the push rod, release the pusher from the push rod, and return the unlocked pusher to its initial position without moving the push rod, wherein said reciprocating means comprises a first cam on a driven shaft, a first cam follower in engagement with the first cam, and means to transmit the motion of the first cam follower to the pusher, and said gripping means comprises a second cam on said driven shaft, a second cam follower, a flexible collar around the push rod and carried on the pusher, and means to transmit the motion of the second cam follower to the flexible collar alternately to lock and release the pusher, the positions of the first and second cams relative to one another on the shaft being such that the second cam will maintain the pusher locked to the push rod while the first cam actuates advancement of the pusher from an initial position and the second cam will release the pusher from locking engagement with the push rod and maintain it in said released condition while the first cam acuates a return of the pusher to its initial position.

6. Drive mechanism for advancing stepwise the scanner carriage of a rotatable film scanning drum a given incremental distance at each revolution of said drum, which comprises a push rod movable endwise, one end of the push rod being in abutment with the scanner carriage, a pusher slidable on the push rod, first means for locking the pusher to the rod and releasing it from locking engagement therewith, second means for reciprocating the pusher axially of the rod and with an amplitude equal to said given incremental distance, and means for alternately actuating said first and second means in timed relation with rotation of the scanning drum successively to lock the pusher and the push rod, move the locked pusher in one direction to advance the push rod said given incremental distance, release the pusher from the push rod, and return the unlocked pusher to its initial position without removing the push rod from abutment with the scanner carriage.

7. Drive mechanism for axially advancing a smooth-surfaced push rod a given incremental distance at regular intervals which comprises a pusher slidable on the push rod, a gripping member on the pusher for locking the pusher to the rod and releasing it from locking engagement therewith, means for reciprocating the pusher axially of the rod, and means for alternately actuating the gripping member and the reciprocating means in timed relation successively to lock the pusher on the push rod, move the locked pusher in one direction to advance the push rod, release the pusher from the push rod, and return the unlocked pusher to its initial position without moving the push rod.

References Cited in the file of this patent
UNITED STATES PATENTS

| Number | Name | Date |
|---|---|---|
| 555,841 | Adams | Mar. 3, 1896 |
| 682,554 | Kassbauer | Sept. 10, 1901 |
| 1,523,819 | McClintock | Jan. 20, 1925 |
| 1,629,375 | Brice | May 17, 1927 |
| 1,837,027 | Drake | Dec. 15, 1931 |
| 1,977,523 | Taylor et al. | Oct. 16, 1934 |